G. W. DEVOE.
Liquid Measure.
No. 60,344.
Patented Dec. 11, 1866.
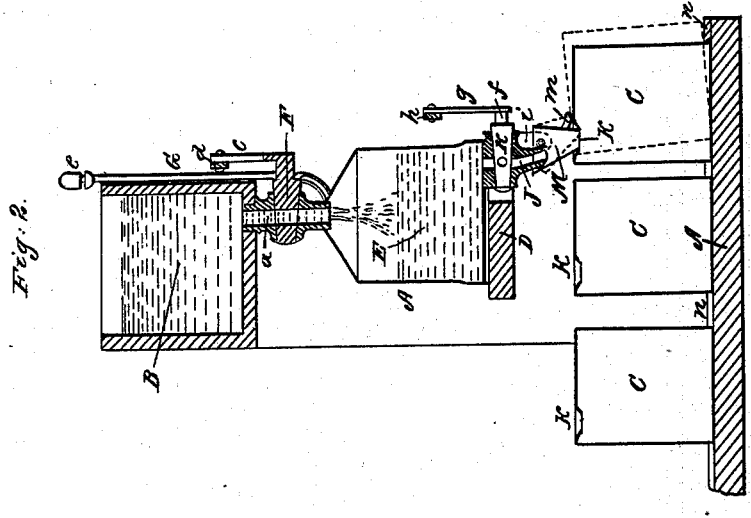
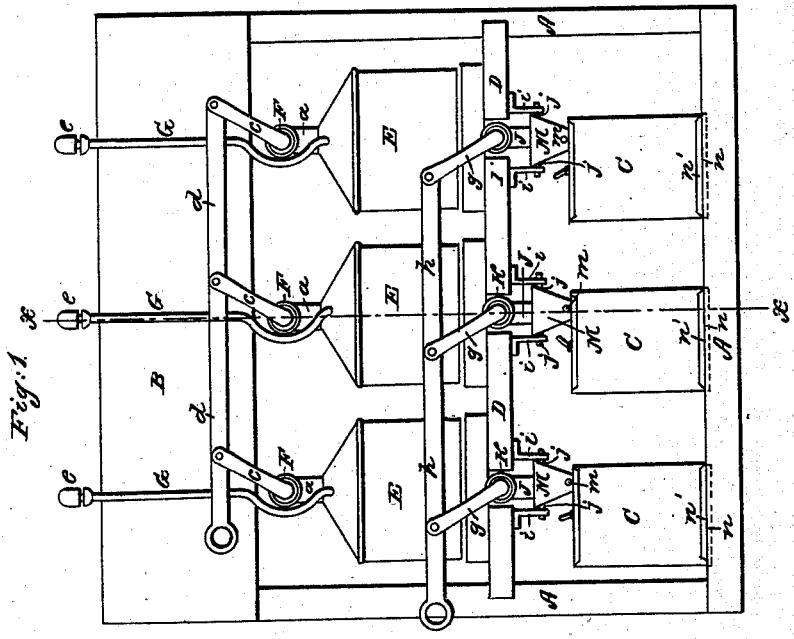
Witnesses:
J. W. Coombs
G. W. Re L.
Inventor:
Geo. W. Devoe.

United States Patent Office.

IMPROVEMENT IN MEASURING LIQUIDS.

GEORGE W. DEVOE, OF NEW YORK, N. Y.

Letters Patent No. 60,344, dated December 11, 1866.

The Schedule referred to in these Letters Patent and making part of the same.

TO ALL WHOM IT MAY CONCERN:

Be it known that I, GEORGE W. DEVOE, of the city, county, and State of New York, have invented a new and improved apparatus for Measuring Liquids; and I do hereby declare that the following is a full, clear, and exact description of the same, reference being had to the accompanying drawings, making a part of this specification, in which—

Figure 1 is a front elevation of an apparatus constructed according to my invention.

Figure 2 is a vertical transverse section of the same, taken in the line $x\ x$, of fig. 1.

Similar letters of reference indicate corresponding parts in both figures.

This invention consists in a novel apparatus, designed more especially for measuring petroleum oil during the operation of filling the cans, in which the said oil is placed for transportation, whereby a number of cans may be rapidly and easily filled with an accurately measured quantity of oil at one and the same time, thus reducing, in a very great degree, the labor required in such measuring and filling operations as ordinarily performed.

A is an upright frame, upon the top of which is placed a reservoir, B, which holds the oils with which the cans, C, are to be filled; and situated underneath this reservoir is a longitudinal shelf, D, upon which any desired number of measuring vessels, E, are arranged in a row, as shown more clearly in fig. 1. The capacity of these measuring vessels should be the same as that of the cans C, and each one is connected with the reservoir B by a tubular neck, $a$, in which is placed a valve, F, in such manner that by turning the said valve F, communication between the measuring vessel and the reservoir may be opened or closed as desired. Secured upon the outer ends of the stems, $b$, of the valves, F, are upwardly projecting arms, $c$, the upper ends of which are connected by a horizontal rod, $d$, so that by moving the said rod $d$ longitudinally in one direction or the other, the valves F will be simultaneously operated to open or close the tubular necks $a$, as the case may be. Projecting upward from the upper end of each measuring vessel, E, at or near the lower end of the neck $a$ thereof, is a pipe, G, which has fixed upon its upper end a whistle, $e$, of any suitable construction, and which is sounded by the air issuing from the pipe G while the measuring vessel is being filled, as will be hereinafter fully explained. Extending downward from the forward portion of the bottom of each measuring vessel, E, is a short tube, J, the lower part of which may be slightly curved forward, as shown in fig. 2, and in which is placed a stop-cock, K. The stems, $f$, of these stop-cocks are furnished at their forward ends with upwardly-projecting levers, $g$, the upper ends of which are connected by a horizontal rod, $h$, the longitudinal movement of which simultaneously turns the stop-cocks K to open or close the tubes J, in the same manner that the valves F are operated by the rod $d$, as hereinbefore explained. Situated upon each side of the lower part of each tube, J, is a hanger, $i$, and suspended in each pair of these hangers, $i$, by means of lateral ears or projections, $j$, is a funnel, M, one of the said funnels being thus suspended under each of the tubes J. Secured to the forward side of each of the said funnels, near the lower end thereof, is a small weight, $m$, which insures the proper position of the funnel while conducting the oil from the measuring vessels, E, to the cans C. These cans, C, are made four-sided, and in the top or upper end of each is formed a hole, $k$, through which the oil passes into the can. Formed transversely in the upper surface of the base A', of the frame A, are shallow grooves, $n$, of which there are just as many as there are measuring vessels, E, and the width of which corresponds to that of the cans C. The forward ends of these grooves, $n$, are closed by shoulders, $n'$, formed longitudinally with the front edge of the base A', and the rearmost ends of the said grooves are open, and terminate at the rearmost edge of the aforesaid base, as shown more clearly in fig. 2. The cans C are placed in the grooves $n$, and are successively pushed underneath the measuring vessels E, to be filled, the grooves $n$ being situated in such relation to the said measuring vessels, that as the cans, C, are thus pushed forward under the measuring vessels, their openings, $k$, will be brought immediately underneath the lower ends of the funnels M. The funnels M, swinging forward when struck by the forward upper edges of the cans C, and allowing the said cans to pass under them until the said cans are brought against the stops formed by the shoulders, $n'$, which brings the openings, $k$, immediately under the lower ends of the funnels, whereupon the weights $m$ cause the said lower ends to drop into the said openings, $k$, and thus bring the funnels in proper position for conducting the oil into the cans C, as represented more plainly in fig. 2; the foremost cans situated in the grooves, as just explained, being ranged in a row parallel with the front side of the frame A, as shown in fig. 1. The rod $d$ is moved longitudinally in one direction to so operate the valves F as to admit the oil from the reservoir B through the necks $a$ into the measuring vessels E. The oil, as it enters the said vessel, displaces the air therein, which rushes out through the pipe G, and sounds the whistles $e$, attached to the upper ends thereof. As the oil rises in each measuring vessel above the lower end of the pipe G, the escape of air through the said pipe, and consequently the sounding of the whistle thereof is of course stopped, the cessation of the sound of the whistle indicating that the vessel is filled. When the whistles $e$ have ceased sounding, thus showing that all the measuring vessels are full, the rod $d$ is moved in an opposite direction, which simultaneously turns all the valves F to close the tubular necks $a$, and the rod $h$ is then moved longitudinally in one direction, so as to simultaneously operate the stop-cocks K to open the tubes J, and thus permit the flow of oil from the measuring vessels into the cans C, the oil being replaced in the measuring vessels by air which passes through the pipes G. The foremost longitudinal row of cans being thus filled, are removed by an attendant whose place is at the forward side of the apparatus, whereupon the cans in each groove are pushed forward by an attendant at the rear thereof, until the succeeding foremost cans are brought against the stop or shoulder $n'$, in the same position as those just removed, and the apparatus being again operated, as just described, the said succeeding longitudinal row of cans is filled in the same manner, the attendant at the rear side of the apparatus placing empty cans in the space made vacant at the rearmost parts of the grooves $n$, by pushing the cans forward therein, as just set forth. The position of the filled cans, when their forward sides are raised up, as required in removing them from the grooves $n$ and of the funnels M during such removal, is shown in red lines in fig. 2. Each successive forward longitudinal row of cans, C, being thus fed forward, rapidly filled and removed from the apparatus with the attention and labor of only two attendants, a much greater number of cans may be filled with a properly measured quantity of oil in a given time than when the said cans are filled in any ordinary way.

What I claim as new, and desire to secure by Letters Patent, is—

1. The suspension and arrangement of the weighted funnels M, in relation with the series of measuring vessels E, and with the cans C as they are pushed under the said funnels, substantially as herein set forth for the purpose specified.

2. A measuring apparatus, consisting of one or more measuring vessels, E, arranged in relation with a reservoir, B, and furnished with inlet and outlet valves or stop-cocks, F K, and with a suspended funnel or funnels, M, and a whistle or whistles, $e$, substantially as herein set forth.

GEO. W. DEVOE.

Witnesses:
HENRY T. BROWN,
J. W. COOMBS.